(12) United States Patent
Takeuchi

(10) Patent No.: US 8,345,351 B2
(45) Date of Patent: Jan. 1, 2013

(54) PORTABLE MICROSCOPE SYSTEM WITH AN INDEPENDENT CONTROL UNIT

(75) Inventor: Atsushi Takeuchi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/296,918

(22) Filed: Nov. 15, 2011

(65) Prior Publication Data

US 2012/0182608 A1 Jul. 19, 2012

Related U.S. Application Data

(63) Continuation of application No. PCT/JP2010/058959, filed on May 27, 2010.

(30) Foreign Application Priority Data

May 27, 2009 (JP) ................................ P2009-127208

(51) Int. Cl.
G02B 21/36 (2006.01)
(52) U.S. Cl. .......................... 359/368; 359/363; 359/369
(58) Field of Classification Search .................. 359/363, 359/368, 369
See application file for complete search history.

(56) References Cited

U.S. PATENT DOCUMENTS

| | | | | |
|---|---|---|---|---|
| 6,636,354 B1 * | 10/2003 | D'Hooge et al. | ............. | 359/385 |
| 7,253,947 B2 * | 8/2007 | Bromage et al. | ............. | 359/368 |
| 7,418,118 B2 * | 8/2008 | Furnas et al. | ................. | 382/128 |
| 2002/0080240 A1 * | 6/2002 | Omi | .............................. | 348/207 |
| 2006/0092503 A1 * | 5/2006 | Saunders | ....................... | 359/368 |
| 2008/0204551 A1 * | 8/2008 | O'Connell et al. | ............. | 348/79 |

FOREIGN PATENT DOCUMENTS

| | | | | |
|---|---|---|---|---|
| JP | 09130664 A | * | 5/1997 | |
| JP | 11164293 A | * | 6/1999 | |
| JP | 2000275543 A | * | 10/2000 | |
| JP | 2001021811 A | * | 1/2001 | |
| JP | 2009216825 A | * | 9/2009 | |
| JP | 2010256439 A | * | 11/2010 | |
| JP | 2011017784 A | * | 1/2011 | |

\* cited by examiner

*Primary Examiner* — Mark Consilvio

(74) *Attorney, Agent, or Firm* — Staas & Halsey LLP

(57) ABSTRACT

A microscope system which can improve the ease of use and the observation environment when a sample is observed using a microscope formed of a stand and a main body which is removable from the stand. A microscope is formed of a main body and a stand, and the main body is removable from the stand. The main body includes an objective lens, an image optical system, a CCD, a compact monitor and a battery, so that the main body, when removed from the stand, can function independently as a microscope. If the main body is mechanically connected to the stand, the main body and the stand are electrically connected via connectors, and an observation image captured by the CCD is supplied from the main body to the stand via the connectors, and is displayed on a monitor.

12 Claims, 7 Drawing Sheets

PORTABLE MICROSCOPE SYSTEM WITH AN INDEPENDENT CONTROL UNIT

This application is a continuation, filed under 35 USC 111(a), of International Application PCT/JP2010/058959, filed May 27, 2010, and claims foreign priority to Japanese application 2009-127208 filed May 27, 2009, and which are incorporated by reference herein in their entireties.

TECHNICAL FIELD

The present invention relates to a microscope system, and more particularly to a microscope system formed of a main body and a stand, so that a sample can be observed in the main unit removed from the stand.

BACKGROUND ART

In a conventional microscope, the main body in which an image optical system, from an objective lens to an eye piece, is disposed is normally integrated with a stand, where a stage and other components are disposed. To observe a sample using this type of microscope, the user adjusts focus by moving the stage disposed on the stand in the optical direction of the image optical system.

However if a sample to be observed is large, the user must process the sample so as to be observed by the microscope, because of the structural limitations of the microscope. In other words, the user must process the sample to become an appropriate size, so that the sample can be placed between the stage and the objective lens when the sample is placed on the stage, and the focal point of the objective lens can came to a desired location. This work required for processing the sample is troublesome.

Some samples cannot even be processed, and in such a case, the user is forced to give up observing the sample using a microscope.

Beside the above mentioned general microscope, a microscope called a "digital microscope" is known. A digital microscope is a microscope formed of a stand and a cylindrical main body which is removable from the stand, and the main body has an optical system including an objective lens and a CCD (Charge Coupled Device) for imaging an observation light from the sample, guided by the optical system.

In the case of observing a sample using a digital microscope, a controller for controlling the operation of the main body and a monitor for displaying an observation image of the sample captured by a CCD are connected to the main unit via a cable. Then observation is performed in a state where the main body is removed from the stand, or in a state where the main body is installed in the stand, depending on the sample to be observed.

For example, if observation is performed in the state where the main body is removed from the stand, the user holds the main body by hand and brings it closer to a desired area of the sample, and observes the sample. In this case, the observation image captured by the CCD is displayed on the monitor, which is connected to the main body. If the digital microscope is used like this, perfect observation becomes possible without processing the sample.

Patent Document 1: Japanese Patent Application Laid-Open No. 2009-8918

In the case of observation using a digital microscope, however, the controller and the monitor are connected to the main body via cables, therefore it is not easy to use the equipment, and the environment to observe the sample is not always good.

For example, in the case of observing a sample in a state where the main body is removed from the stand, the user must transport not only the main body, but also the controller and the monitor to the position of the sample, and ease of use is considerably diminished especially when the controller and the monitor are heavy.

In the case of observing a sample in a state where the main body is secured to the stand, not only does the routing of the cables connecting the main body with the controller and the monitor become complicated, but also in some cases, the controller and the monitor cannot be arranged in desired positions due to restrictions in the length of the cables.

Furthermore, if the main body secured to the stand vibrates for such a reason as the motion of the cable, the observation environment of the sample deteriorates. In concrete terms, if the main body becomes unstable and vibrates, the observation image to be displayed on the monitor is also shaken, hence in some cases observing the sample may become difficult.

DISCLOSURE OF THE INVENTION

With the foregoing in view, it is an object of the present invention to improve ease of use and the observation environment of a sample when the sample is observed using a microscope formed of a stand and a main body, which is removable from the stand.

A first microscope system of an embodiment of the present invention includes: a portable microscope which has an observation optical system for observing a sample, an image capturing unit for capturing an observation image, and a microscope control unit for controlling these components, the portable microscope allowing microscope observation; and a stand which has an installation unit for installing the portable microscope, a stand side operation unit for operating the portable microscope, and a stand side control unit for displaying image data captured by the portable microscope on a monitor apparatus, wherein a communication unit is disposed on the stand side and in the portable microscope so as to allow communication between the stand and the portable microscope, a detection unit is disposed on the installation unit of the stand so as to detect whether the portable microscope is installed, and when the detection unit detects that the portable microscope is installed in the installation unit of the stand, operation of the portable microscope can be controlled by an operation signal of the stand side operation unit, and when the portable microscope is not installed in the installation unit of the stand, the microscope control unit of the portable microscope and the stand side control unit can function independently.

A second microscope system of the present invention comprises: a portable microscope which has an observation optical system for observing a sample, an image capturing unit for capturing an observation image of the observation optical system, and a microscope control unit for controlling these components, the portable microscope being carried by holding a main body gripping section thereof, to allow performing microscope observation; and a stand which has an installation unit for electrically and mechanically installing the portable microscope, a stand side operation unit for operating the portable microscope, and a stand side control unit for controlling these components, the stand allowing to perform microscope observation in a state where the portable microscope is installed, wherein if the portable microscope is installed in the installation unit of the stand, the stand side control unit and the microscope control unit communicate with each other so that operation of the portable microscope can be controlled by an operation signal of the stand side operation unit, and if the portable microscope is not installed in the installation unit of the stand, the microscope control unit of the portable microscope and the stand side control unit of the stand are maintained to function independently.

According to the present invention, a sample can be observed using a microscope formed of a stand and a main body, which is removable from the stand. Particularly, according to the present invention, ease of use and the observation environment of a sample can be improved when the sample is observed using a microscope formed of a stand and a main body, which is removable from the stand.

BEST MODE FOR CARRYING OUT THE INVENTION

Embodiments of the present invention will now be described with reference to the drawings.

Figure 1:
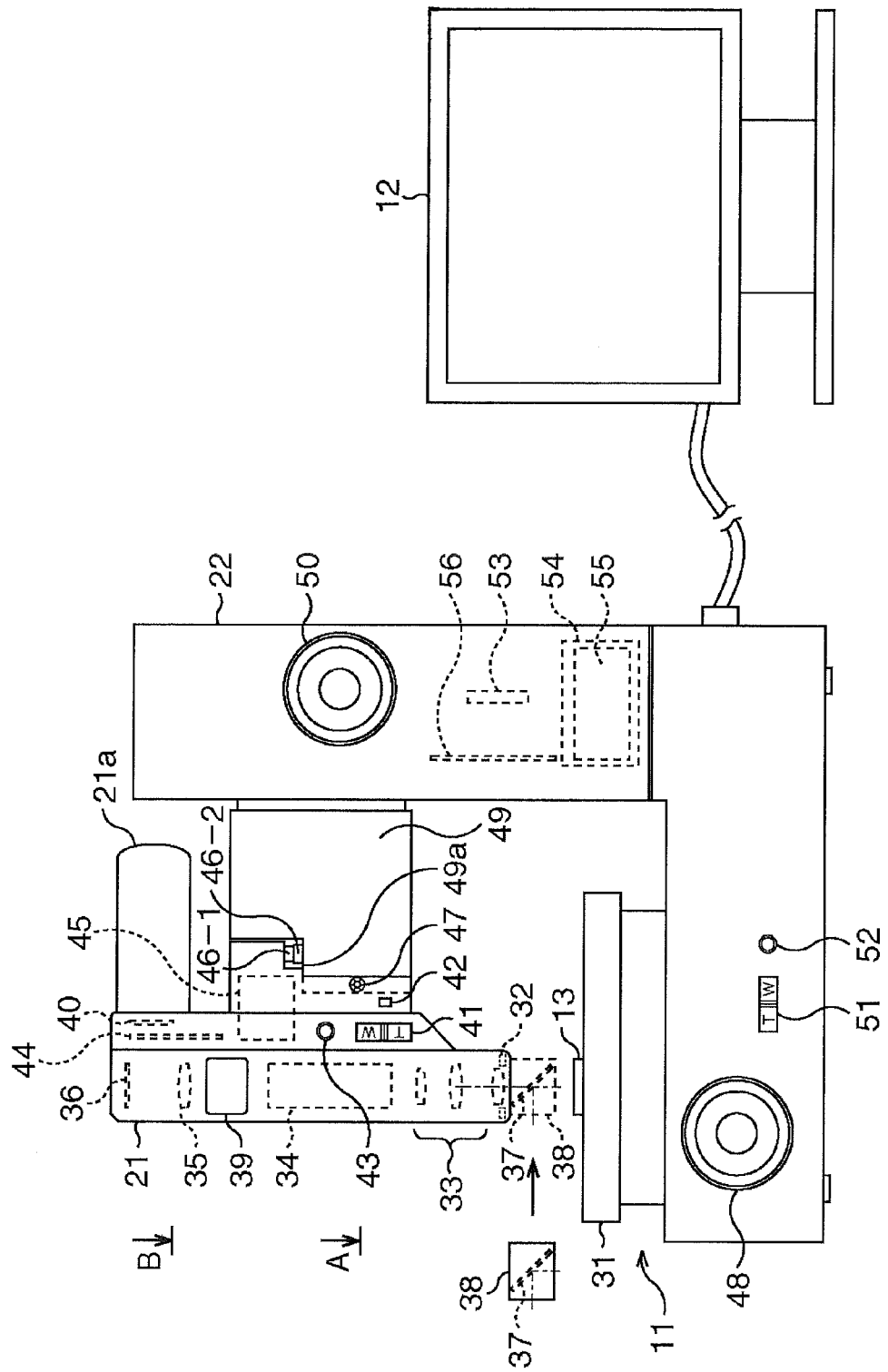
FIG. 1 is a diagram depicting a configuration example of an embodiment of a microscope observation system to which the present invention is applied.

FIG. 1 is a diagram depicting a configuration example of an embodiment of a microscope observation system to which the present invention is applied.

This microscope observation system comprises a microscope 11 and a monitor 12 connected to the microscope 11, and a sample 13, which is an observation target, is observed by the microscope observation system.

The microscope 11 further comprises a portable microscope 21 (hereafter "main body 21") which includes an optical system to observe the sample 13, a picture element, and an electric system for controlling each component, and a stand 22 to which the main body 21 is secured, and the main body 21 is removable from the stand 22. In the example in FIG. 1, the main body 21 and the stand 22 are mechanically and electrically connected, and the sample 13 is placed on a stage 31 which is disposed on the stand 22. Even if the main body 21 is removed from the stand 22, the main body 21 can function independently as a microscope.

On the main body 21, a main body gripping section 21*a* for holding the main body 21 is created so that the user can easily carry and operate the main body 21, and various operation switches (zoom switch 41, dimming switch 43) are disposed around the main body gripping section 21*a*.

On the stage 31 side edge of the main body 21, a plurality of LEDs (Light Emitting Diode) 32 are built in along the inner wall of the housing of the main body 21, and the LEDs 32 illuminate the sample 13 by irradiating the illumination light onto the sample 13. In the main body 21, the plurality of LEDs 32 can be turned ON all at once, or only a part of the LEDs 32 can be turned ON to perform oblique illumination on the sample 13.

On the stage 31 side edge of the main body 21, an objective lens 33 is disposed so as to be surrounded by the LEDs 32, and a zoom optical system 34 for changing magnification of an image of an observation light from the sample 13, and an image optical system 35 for forming an image of an observation light are disposed at the center inside the main body 21.

On the edge at the opposite side of the edge where the objective lens 33 is disposed, inside the main body 21, a CCD 36 is disposed for capturing an image of the observation light formed by the image optical system 35, so that an observation image of a sample 13, the image data of the observation image to be more precise, is obtained.

If it is necessary to perform coaxial epi-illumination on the sample 13, when the magnification of the objective lens 33 is high, for example, an adapter 38, enclosing a half mirror 37, is attached to the stage 31 side edge of the main body 21. If the adapter 38 is secured to the main body 21, the half mirror 37 is positioned on the optical axis of the objective lens 33, and the coaxial epi-illumination can be performed. In other words, the illumination light from a light source, which is not illustrated, and which is connected to the adapter 38, is reflected on the half mirror 37, and is irradiated onto the sample 13.

In the case of performing the coaxial epi-illumination, instead of attaching the adapter 38 on the main body 21, the light source and the half mirror 37 for the coaxial epi-illumination may be equipped in the main body 21 in advance, so that the half mirror 37 is positioned on the optical axis of the objective lens 33 by being electrically driven.

The main body 21 further comprises a compact monitor 39 which is constituted by a liquid crystal monitor, for example, for displaying an observation image captured by the CCD 36, and a memory 40 which is removable from the main body 21 and is used for recording observation images.

The main body 21 further comprises a zoom switch 41 which is operated upon changing the zoom magnification of the zoom optical system 34, a capture button 42 which is operated upon instructing to capture an observation image, and a dimming switch 43 which is operated upon adjusting light quantity of illumination from the LEDs 32.

Furthermore, inside the main body 21, a control board 44 for controlling the general operations of the main body 21, and a battery 45 for supplying power to each component of the main body 21, such as the LEDs 32, compact monitor 39, CCD 36 and control board 44 are disposed. The battery 45 is removable from the main body 21, so that the battery 45 can be charged by a dedicated charger, which is not illustrated, in a state of being removed from the main body 21. The control board 44, which is a microscope control unit, executes control of each component (e.g. LEDs 32, CCD 36, compact monitor 39, zoom switch 41, capture button 42, dimming switch 43) of the main body 21.

A pair of connectors 46-1 and 46-2 is disposed on the main body 21 and the stand 22 for connecting the main body 21 and the stand 22. If the connector 46-1 and the connector 46-2 are connected, the main body 21 and the stand 22 are mechanically connected, and also are electrically connected. The connector 46-1 and the connector 46-2 will be simply called "connectors 46", unless a clear distinction is necessary.

A clamp 47, which secures the main body 21 to the stand 22, is disposed on the main body 21 when the main body 21 is connected to the stand 22.

A vertical motion handle 48, which operates the stage 31 in vertical directions of FIG. 1, is disposed on the stand 22. If the vertical motion handle 48 is operated, the stage 31 is driven and moved.

The stage 31 can also be moved in the lateral direction and depth direction in FIG. 1 by handles, not illustrated here. The stage 31 may be manually driven by a mechanical mechanism, or may be electrically driven. A mechanism for rotating or tilting the stage 31 may also be disposed.

An arm 49, to which the main body 21 is connected, is disposed on the stand 22, and if a vertical motion handle 50 disposed on the stand 22 is operated, the arm 49 vertically moves with respect to the stand 22. By moving the vertical motion handle 48 and the vertical motion handle 50, the user can move the stage 31 or the main body 21 in the vertical directions so as to adjust focus. The arm 49 can also be either manually or electrically driven.

In the case of using the microscope 11 in a state of installing the main body 21 in the stand 22, the main body 21 is latched onto a contact surface 49a where the connector 46-2 of the arm 49 is disposed. Therefore if the main body 21 is pushed onto the contact surface 49a and if the main body 21 is secured to the arm 49 by the clamp 47, stability of the main body 21 can be improved.

A zoom switch 51 which is operated upon changing the zoom magnification of the zoom optical system 34, a dimming switch 52 which is operated upon adjusting the light quantity of the illumination light from the LED 32, and a memory 53 for recording observation images are disposed on the stand 22. The memory 53 is removable from the stand 22.

On the stand 22, a feeding unit 54 is disposed, to supply power from a power supply (not illustrated) connected to the stand 22, to each component of the main body 21, such as the LEDs 32, the compact monitor 39, the CCD 36 and the control board 44, via the connectors 46. The feeding unit 54 has a charge unit 55, and the charge unit 55 can charge the battery 45 by supplying power supplied from the power supply (not illustrated) to the feeding unit 54, to the battery 45 via the connectors 46.

A control board 56 for controlling the general operation of the stand 22 is also disposed on the stand 22, and the control board 56, which is a stand side control unit, is electrically connected with the control board 44, which is a microscope control unit, via the connector 46. For example, if an observation image is supplied from the control board 44 via the connector 46, the control board 56 records the supplied observation image in the memory 53, or displays the image on the monitor 12 connected to the stand 22. If the zoom switch 51 or the dimming switch 52 is operated, the control board 56 instructs the control board 44 via the connector 46 to change the zoom magnification or to change the light quantity of the LED 32, according to the signal supplied from the zoom switch 51 or the dimming switch 52.

A touch panel, which is not illustrated, is superposed on the display unit of the monitor 12, and the user can instruct various operations of the microscope 11, which are executed during observation of the sample 13, such as capturing the observation image. If the user operates the touch panel, the signal according to this operation is supplied from the monitor 12 to the control board 56.

By operating the touch panel on the monitor 12, the user can also display information to indicate an observation image recorded in the memory 53 or the memory 40, such as a file name, thumbnail image, or an observation image itself, on the monitor 12.

Now the mechanical connection and electrical connection between the main body 21 and the stand 22 will be described with reference to FIG. 2 and FIG. 3.

Figure 2:
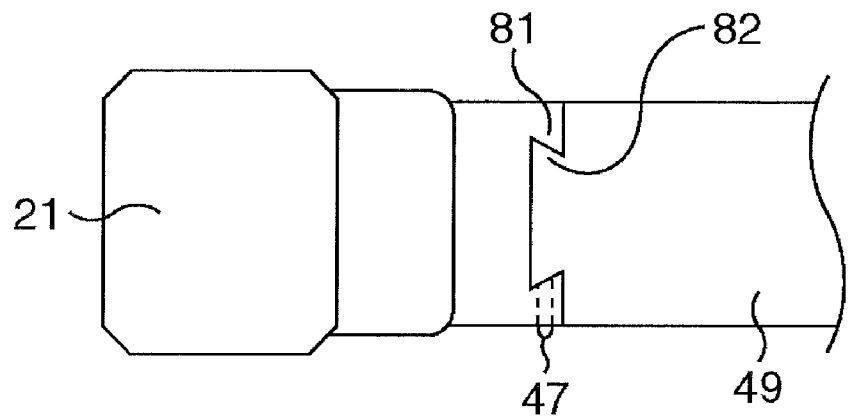
FIG. 2 is an arrow view depicting a cross-section of a microscope.

FIG. 2 is an arrow view when the microscope 11 is viewed from the arrow A direction in FIG. 1. In other words, FIG. 2 is a cross-sectional view of the microscope 11 at the position of the clamp 47, when the microscope 11 is viewed from the top to bottom direction in FIG. 1.

The main unit 21 and the stand 22 are mechanically connected by the above mentioned connector 46, but to be more precise, the mechanical connection between the main unit 21 and the stand 22 is mainly implemented by a female dovetail 81 disposed in the main body 21 and a male dovetail 82 disposed in the arm 49.

In other words, on the surface of the main body 21 which contacts with the arm 49, a long groove, that is the female dovetail 81, is created in the depth direction in FIG. 2, that is, a vertical direction (also called "Z direction" herein below) in FIG. 1. On the surface of the arm 49 which contacts with the main body 21, a long protruding portion, that is the male dovetail 82, which inter-fits with the female dovetail 81, is created in the Z direction.

To mechanically connect the main body 21 and the stand 22, the user slides the main body 21 in the Z direction in a state where the female dovetail 81 and the male dovetail 82 inter-fit, so that the main body 21 is located at a predetermined position. When the main body 21 is set at a predetermined position, the user pushes the female dovetail 81 of the main body 21 into the male dovetail 82 of the arm 49 using the long clamp 47, so that the main body 21 is secured to the arm 49. Thus the main body 21 is mechanically connected to the stand 22. The clamp 47 may be a screw mechanism type, such as a set screw.

Figure 3:
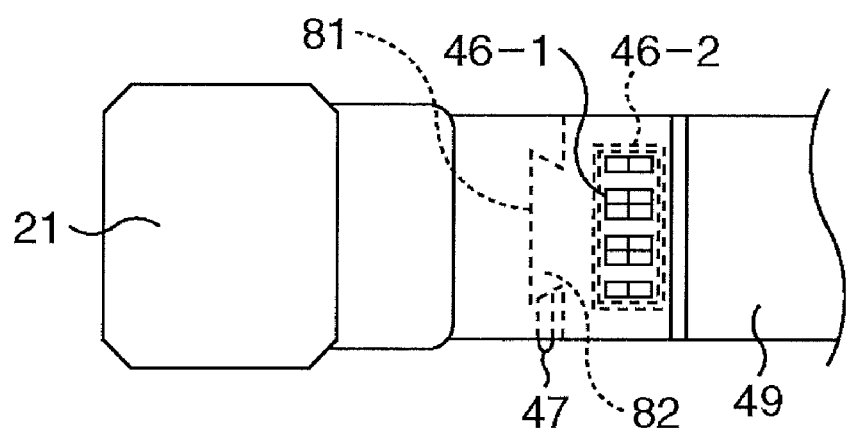
FIG. 3 is an arrow view depicting a cross-section of a microscope.

In the microscope 11, as FIG. 3 shows, as soon as the main body 21 is mechanically connected (secured) to the stand 22, the main body 21 and the stand 22 are electrically connected. FIG. 3 is an arrow view when the microscope 11 is viewed from the direction of the arrow B in FIG. 1. In other words, FIG. 3 is a cross-sectional view of the microscope 11 at the position near the compact monitor 39 when the microscope 11 is viewed from the top to bottom direction in FIG. 1.

The connectors 46 are disposed in the microscope 11, so that when the main body 21 and the arm 49 are mechanically connected, the connector 46-1 and the connector 46-2 are also mechanically connected. If the connectors 46 are mechanically connected with each other, the respective power feeding lines of the main body 21 and the stand 22, and the wires for connecting the control board 44 and the control board 56 are interconnected, and the main body 21 and the stand 22 are also electrically connected. In other words, the main body 21 and the stand 22 are both mechanically and electrically connected by one procedure.

Therefore the user can easily connect the main body 21 and the stand 22 both mechanically and electrically, merely by securing the main body 21 to the arm 49, without special consideration about mechanical and electrical connections.

When the main body 21 is secured to the arm 49, the connector 46-1 of the main body 21 may shift from the connector 46-2 of the stand 22 in a direction perpendicular to the Z direction, that is, in the longitudinal direction and lateral direction (hereafter "XY directions") in FIG. 3, for any number of reasons.

Therefore considering the positional adjustment of the main body 21 in the Z direction, and the shift of the main body 21 in the XY directions, it is preferable to provide a function to allow some shift of the connectors 46 in the Z direction and XY directions using a spring, for example. The connectors 46 may be held by mechanical components, and a mechanism for allowing a shift of the connectors 46 may be created in the mechanical components.

In the above description, the main body 21 and the arm 49 are connected via the female dovetail 81 and the male dovetail 82 using dovetail shapes, but any connection can be used if the position of the main body 21, with respect to the arm 49, can be adjusted in the Z direction and XY directions, and the main body 21 and the stand 22 can be connected mechanically and electrically simultaneously. For example, the main body 21 and the stand 22 may be connected using the inter-fitting of round bars, or rectangular guides.

Figure 4:
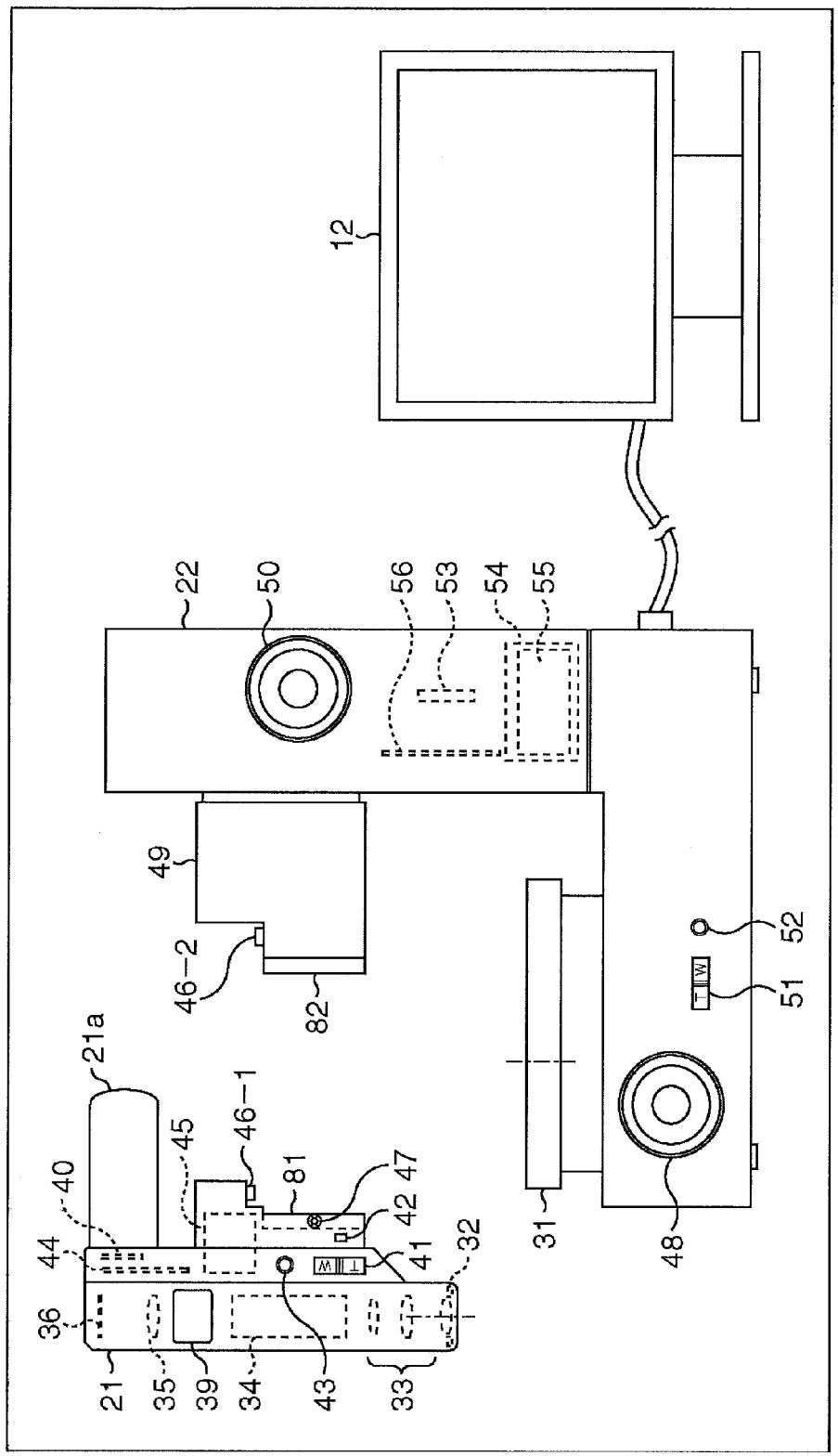
FIG. 4 is a diagram depicting an appearance when the main body is removed from the stand.

The LEDs 32 as a light source, the objective lens 33 of the image optical system 35 for forming an image of a sample 13, the CCD 36 for capturing an observation image, the compact monitor 39 for displaying the observation image, and the battery 45 for supplying power to each component of the main body 21 are disposed on the main body 21. Therefore as FIG. 4 shows, the user can remove the main body 21 from the stand 22, and can observe a sample 13 using the main body 21 as an independent microscope.

If the main unit 21 is removed from the stand 22, the control board 44 switches the power supply source to the main body 21 from the stand 22 (feeding unit 54) to the battery 45, and also switches the destination, to which the observation image captured by the CCD 36 is supplied, from the stand 22 to the compact monitor 39. Thereby the main body 21 functions as an independent microscope, and the captured observation image is displayed on the compact monitor 39.

The user holds the main body 21 and moves the main body 21 to approach a sample 13, so that the desired area of the sample 13 can be observed. Since the observation image of the area of the sample 13 to which the main body 21 is approached is displayed on the compact monitor 39, the user can observe the sample 13 while watching the displayed observation image.

In this way, according to the microscope 11, the main body 21 removed from the stand 22 functions as an independent microscope, therefore a sample 13 can be easily observed without connecting a monitor and a controller to the main body 21 via a cable or the like. As a result, ease of use of the microscope 11 can be improved.

When the power of the microscope 11 is turned ON and power is supplied to each component of the microscope 11, the microscope 11 starts observation processing, which is a processing to capture the image of the sample 13, and display or record the observation image. The observation processing by the microscope control unit (control board 44) of the microscope 11 (processing by the microscope control unit 44) will now be described with reference to the flow chart in FIG. 5.

In step S11, the control board 44 determines whether the main body 21 is electrically connected to the stand 22.

For example, whether the main body 21 is connected to the stand 22 is detected by a mechanical switch (not illustrated) disposed on the connector 46. A mechanism to supply a signal to notify the connection state from the control board 56 to the control board 44 when the main body 21 and the stand 22 are electrically connected may be disposed in the microscope 11, so that the connection with the stand 22 can be detected by this mechanism.

If it is determined that the main body 21 is connected to the stand 22 in step S11, the control board 44 selects the feeding unit 54 of the stand 22 as the power supply source to the main body 21 in step S12.

Then the control board 44 instructs the control board 56 to supply power from the feeding unit 54 via the connectors 46. The control board 56 controls the operation of the feeding unit 54 according to the instruction from the control board 44, and the feeding unit 54 supplies the power from an external power supply to each component of the main body 21 via the connectors 46, according to the control by the control board 56.

In step S13, the charge unit 55 of the feeding unit 54 supplies power to the battery 45 via the connectors 46, and charges the battery 45. Thereby the user can charge the battery 45 without removing it from the main body 21.

In step S14, the control board 44 determines whether the main body 21 changed from the state of not being connected to the stand 22, to the state of being connected to the stand 22. In other words, in this processing in step S14, it is determined whether all the observation images recorded in the memory 40 of the main body 21 are recorded in the memory 53 of the stand 22.

If it is determined that the unconnected state is changed to the connected state in step S14, the control board 44 supplies the observation image recorded in the memory 40 of the main body 21 to the control board 56 via the connectors 46, and records the image in the memory 53 of the stand 22 in step S15. The control board 56 supplies the observation image supplied from the control board 44 to the memory 53, and records the image in the memory 53.

For example, in the state where the main body 21 is removed from the stand 22, the main body 21 operates as an independent microscope. If the user operates the capture button 42 in this state, the control board 44 captures the observation image, as a moving image supplied from the CCD 36, according to the signal supplied from the capture button 42, and records the image in the memory 40.

Since the main body 21 can operate independently like this, it is preferable that the open capacity of the recording area of the memory 40, installed in the main body 21, always remains high. Therefore if the state of the main body 21 operating independently changes to the state of the main body 21 being connected to the stand 22, the control board 44 reads the observation image recorded in the memory 40 of the main body 21, and transfers the image to the memory 53 of the stand 22, so as to secure the open capacity of the recording area of the memory 40. Thereby a higher open capacity of memory 40 can be secured without required operation by the user.

In the above description, the observation image recorded in the memory 40 is transferred to the memory 53, and the transferred observation image is deleted from the memory 40, but the observation image recorded in the memory 40 may be copied to the memory 53. In either case, all the observation images captured by the microscope 11 can be managed in the memory 53 by recording the observation images in the memory 53.

In the case of transferring or copying an observation image to or in the memory 53, only observation images which are not recorded in the memory 53, out of the observation images recorded in the memory 40, may be transferred or copied. In this case, it is specified which observation image is transferred or copied by the control board 44 obtaining information, for specifying observation images recorded in the memory 53, from the control board 56. If there is sufficient capacity in memory 40, this transfer and copy of an image need not always be executed.

Instead of recording an observation image recorded in the memory 40 of the main body 21 to the memory 53 of the stand 22 when the main body 21 is connected to the stand 22, the observation image recorded in the memory 40 may be recorded in the memory 53 when the user operates the touch panel disposed on the monitor 12, and instructs recording of the observation image.

If the observation image is recorded in the memory 53 like this in step S15, the processing advances to step S16. If it is determined that the unconnected state has not changed to the connected state in step S14, that is if it is determined that the main body 21 is continuously connected to the stand 22, then the processing in step S15 is not performed, and processing advances to step S16.

For example, an observation image recorded in the memory 40 is recorded to the memory 53 immediately after the main body 21 is connected to the stand 22, hence the observation image has already been recorded in the memory 53 if the main body 21 is continuously connected to the stand 22. Therefore if the main body 21 is continuously connected to the stand 22, the processing is step S15 is not performed.

If it is determined that the unconnected state has not been changed to the connected state in step S14, or if the observation image is recorded in the memory 53 in step S15, the control board 44 selects the stand 22 as the destination to which the observation image is supplied in step S16. Thereby the captured observation image, as a still image, is recorded in the memory 53, and the observation image, as a live image (moving image), is displayed on the monitor 12.

If the destination to which the observation image is supplied is switched to the stand 22 side, the observation image is displayed on the monitor 12 of the display unit, which is larger than the compact monitor 39, hence there is no need to display the observation image on the compact monitor 39. Therefore the control board 44 turns the compact monitor 39 OFF once the destination to which the observation image is supplied is switched to the stand 22. Thereby unnecessary consumption of power and heat from the compact monitor 39 can be controlled.

Instead the observation image may be displayed on both the monitor 12 and the compact monitor 39 without turning the compact monitor 39 OFF. Or instead the observation image may be displayed on the monitor 12, and the information on the observation conditions of the sample 13, such as the zoom magnification of the observation image and the light quantity of the LEDs 32, may be displayed on the compact monitor 39. If the control board 56 of the stand 22 detects that the monitor 12 is not electrically connected to the stand 22, the observation image is displayed on the compact monitor 39 of the portable microscope. A display destination specification switch, for specifying either the monitor 12 or the compact monitor 39 as the display destination of the observation image, may be disposed in the stand 22.

For example, if the zoom switch 41 or the dimming switch 43 is operated, a signal according to the operation is supplied from the zoom switch 41 or the dimming switch 43 to the control board 44. Furthermore if the zoom switch 51 or the dimming switch 52 is operated, a signal according to the operation is supplied from the control board 56 to the control board 44.

Since the control board 44 can receive information on the observation conditions of the sample 13 in the microscope 11, such as the zoom magnification of the zoom optical system 34, based on the signals supplied from the zoom switch 41 and the control board 56, the control board 44 displays the information on the observation conditions on the compact monitor 39. The information on the observation conditions may be displayed on the monitor 12 as well.

If the destination to which the observation image is supplied is selected, the microscope 11 captures the observation image of the sample 13 in step S17. In other words, the control board 44 controls the LED 32 to indicate the illumination light on the sample 13. Then the illumination light from the LEDs 32 is irradiated onto the sample 13, whereby the observation light from the sample 13 enters the CCD 36 via the objective lens 33, the zoom optical system 34 and the image optical system 35. The CCD 36 captures the observation image by receiving the entered observation light and performing photoelectric conversion. The observation image of each frame, as a moving image obtained like this, is supplied from the CCD 36 to the control board 44.

In step S18, the control board 44 supplies the observation image, as a moving image supplied from the CCD 36, to the control board 56 of the stand 22 via the connector 46. Then the control board 56 supplies the observation image from the control board 44 to the monitor 12, and displays the image. Thereby the user can observe the sample 13 while watching the observation image displayed on the monitor 12.

In step S19, the control board 44 determines whether capturing the observation image was instructed, based on a signal supplied from the capture button 42, or a signal supplied from the control board 56 according to the operation on the touch panel of the monitor 12 by the user.

If it is determined that the capture was instructed in step S19, the control board 44 captures the observation image supplied from the CCD 36, and supplies the captured observation image to the control board 56 of the stand 22 via the connectors 46 in step S20. Then the control board 56 supplies the observation image supplied from the control board 44 to the memory 53, records the image in the memory 53, and processing advances to step S21.

The captured observation image may be not only recorded in the memory 53, but also displayed on the monitor 12.

If it is determined that capturing was not instructed in step S19, on the other hand, the processing in step S20 is not performed, and processing advances to step S21.

If it is determined that capturing was not instructed in step S19, or if the observation image was captured in step S20, the control board 44 determines whether the optical system of the microscope 11 was operated in step S21.

For example, if a signal according to the operation of the user is supplied from the zoom switch 41 or the dimming switch 43 to the control board 44, or if a signal according to the operation for the zoom switch 51 or the dimming switch 52 is supplied from the control board 56 to the control board 44, it is determined that the optical system was operated.

If it is determined that the optical system was operated in step S21, the control board 44 performs processing according to the operation by the user in step S22, and processing then advances to step S23.

If the zoom switch 41 or the zoom switch 51 is operated, for example, the control board 44 controls a drive circuit, which is not illustrated, moves the lenses constituting the zoom optical system 34, and changes the zoom magnification of the zoom optical system 34. If the dimming switch 43 or the dimming switch 52 is operated, for example, the control board 44 controls the LEDs 32, and changes the light quantity of the illumination light from the LEDs 32.

If it is determined that the optical system was not operated in step S21, on the other hand, the processing in step S22 is not performed, and processing advances to step S23.

If it is determined that the optical system was not operated in step S21, or if processing according to the operation is performed in step S22, the control board 44 determines whether the power of the microscope 11 is turned OFF or not in step S23. For example, if the user operated a power switch (not illustrated) and instructed to turn the power of the microscope 11 OFF, it is determined that the power is turned OFF.

If it is determined that the power is not turned OFF in step S23, the sample 13 is continuously observed, hence the processing returns to step S11, and the above mentioned processing is repeated.

If it is determined that the power is turned OFF in step S23, the control board 44 and the control board 56 turn the power of the microscope 11 OFF, and observation processing ends.

If it is determined that the main body 21 is not connected to the stand 22 in step S11, the control board 44 selects the battery 45 of the main body 21 as the power supply source to the main body 21 in step S24. In other words, the control board 44 controls the battery 45, and supplies power to each component of the main body 21. Thereby the main body 21 can function as an independent microscope.

If the main body 21 is removed from the stand 22, the user observes the sample 13 with holding the main body 21 by hand, as described with reference to FIG. 4.

In step S25, the control board 44 selects the main body 21 as the destination to which the observation image is supplied. Thereby the captured observation image as a still image is recorded in the memory 40, and the observation image as a live image (moving image) is displayed on the compact monitor 39.

In step S26, the microscope 11 captures the observation image of the sample 13. In other words, the control board 44 controls the LEDs 32 to irradiate the illumination light, and causes the CCD 36 to receive the observation light which entered from the sample 13 to the CCD 36 via the observation lens 33 to the image optical system 35, so as to capture the observation image. The captured observation image is supplied from the CCD 36 to the control board 44.

In step S27, the control board 44 supplies the observation image as a moving image supplied from the CCD 36 to the compact monitor 39, and displays the image. Thereby the user can observe the sample 13 while watching the observation image displayed on the compact monitor 39.

In step S28, the control board 44 determines whether capturing the observation image was instructed based on the signal supplied from the capture button 42.

If it is determined that capturing was instructed in step S28, the control board 44 captures the observation image supplied from the CCD 36 in step S29. Furthermore the control board 44 supplies the captured observation image to the memory 40, and records the image. Then the processing advances to step S21, and the above mentioned processing is repeated.

If it is determined that capturing was not instructed in step S28, the processing in step S29 is not performed, and processing advances to step S21, and the above mentioned processing is repeated.

In this way, the microscope 11 switches the power supply source and the destination to which the observation image is supplied are switched, depending on whether the main body 21 and the stand 22 are connected or not, and captures the observation image of the sample 13. Thereby the ease of use of the microscope 11 can be improved.

For example, if the main body 21 is installed in the stand 22, power is externally supplied to the main body 21 so that consumption of the battery 45 is minimized. This means that the user can use the main body 21 for a longer time even if the main body 21 is used in a state removed from the stand 22.

In the case when the main body 21 is installed in the stand 22, the observation image can be displayed much larger and more clearly for observation if the monitor 12, of which display unit is larger than the compact monitor 39, is connected to the stand 22.

Furthermore according to the microscope 11, the main body 21 functions as an independent microscope if the main body 21 is removed from the stand 22, and if the main body 21 is mechanically connected to the stand 22, the main body 21 is electrically connected to the stand 22 at the same time, therefore ease of use and the observation environment of the sample 13 can be improved.

For example, in the case when the main body 21 is removed from the stand 22, the main body 21 can function as an independent microscope, which means that the monitor and the controller need not be connected to the main body 21 via cables or the like, and ease of use improves. In other words, the user can simply remove the main body 21 from the stand 22, and start observation simply and quickly, without moving and carrying the controller and the monitor.

In the case when the main body 21 is installed in the stand 22 to observe the sample 13, mechanical connection of the main body 21 and the stand 22 simultaneously becomes an electrical connection of the main body 21 and the stand 22, hence there is no need to connect the main body 21 and the stand 22 via a cable in a separate operation. Furthermore there is no need to connect such apparatuses as a monitor to the main body 21, therefore operability is not interrupted by the troublesome routing of cables.

Also according to the microscope 11, there is no need to connect other apparatuses via cables to the main body 21, hence the main body 21 secured to the stand 22 does not vibrate due to cable movement, and the sample 13 can be observed under a better environment. In other words, the observation environment of the sample 13 can be improved.

Figure 6:
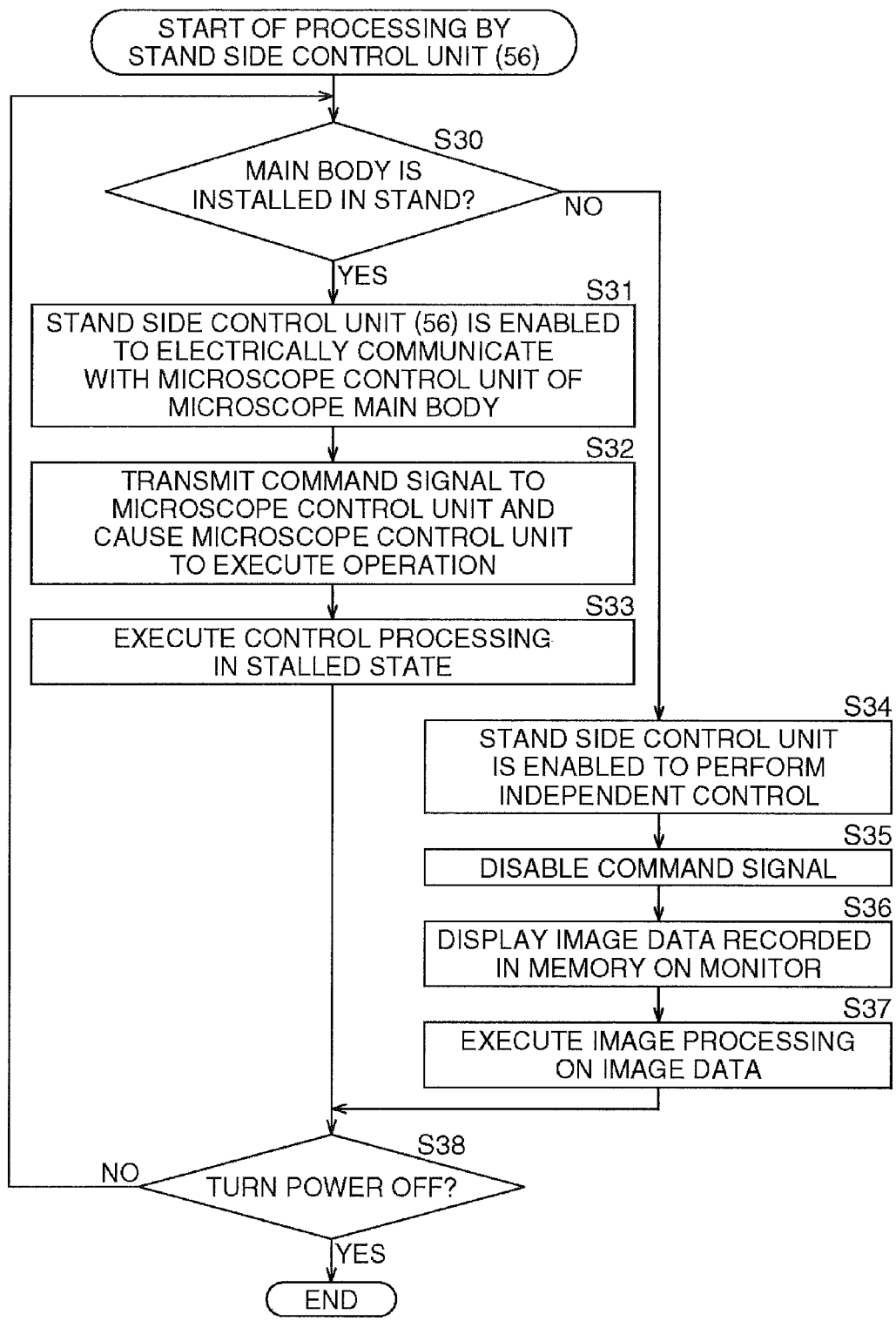
FIG. 6 is a flow chart depicting a processing of a stand side control unit.

Now the processing by the stand side control unit (control board 56) of the stand 22 will be described with reference to the flow chart in FIG. 6.

In step S30, the control board 56 detects whether the main body 21 of the portable microscope is installed in the stand 22, and if a mechanical and electrical connection is detected, processing advances to step S31, whereas if no connection is detected, processing advances to step S34.

In step S31, the stand side control unit (control board 56) is enabled to electrically communicate with the microscope control unit (control board 44) of the main unit 21.

If the stand side control unit (control board 56) is operated, that is if switches are operated for zooming, capturing and the like, in step S32, the control board 56 transmits this command signal to the microscope control unit (control board 44), and causes the microscope control unit to execute the instructed operation. The stand side control unit (control board 56) can also execute the image processing on the image data which is stored in the memory 53 and transmitted from the main body 21, in cooperation with the monitor 12, just like the later mentioned step S37.

Figure 5:
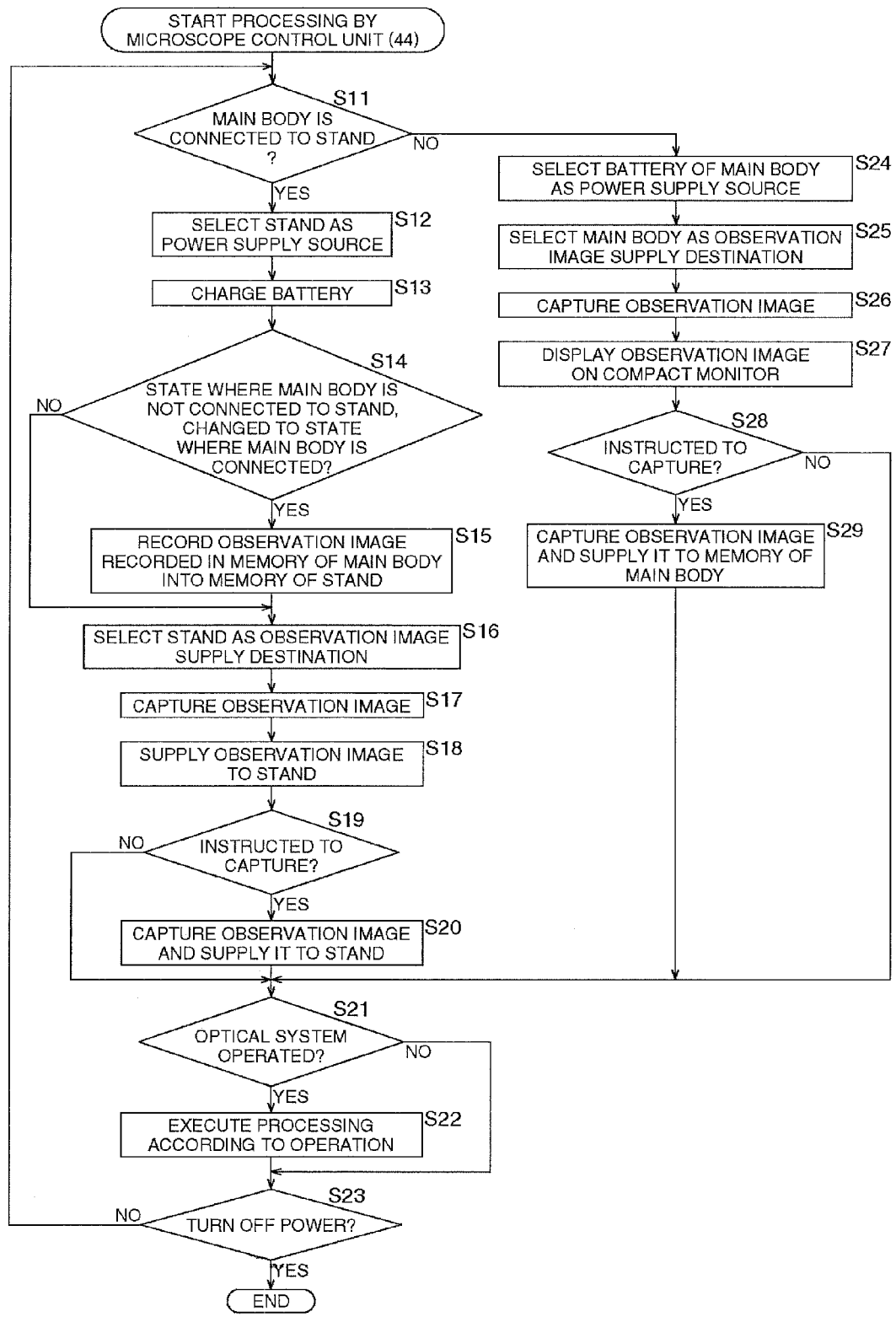
FIG. 5 is a flow chart depicting a processing of a microscope control unit.

In step S33, the control board 56 performs control processing when the main body 21 is installed in the stand 22. In concrete terms, in step S33, the control board 56 performs similar control in steps S12 to S22 in FIG. 5. In other words, the processing by the control board 56 described for steps S12 to S22 in FIG. 5 is performed. Then after the processing in step S33 is performed, processing advances to step S38.

If it is determined that the main body 21 is not installed in the stand 22 in step S30, the processing in step S34 is performed. If the main body 21 is not installed in the stand 22, not only can the main body 21 operate independently, but the stand 22 can also operate independently.

In step S34, the stand side control unit (control board 56) is enabled to perform independent control.

In step S35, even if the stand 22 is operated, that is even if such switches for zooming, capturing and the like (e.g. zoom switch 51 and dimming switch 52) are operated, the control board 56 disables these command signals.

The operation switches of the stand (e.g. zoom switch 51 and dimming switch 52) simply drive nothing even if operated here, but may be designed to perform another operation instead of the operation of the main body 21 of the portable microscope.

For example, the zoom switch 51 of the stand 22 is switched so as to zoom the image displayed on the monitor 12 (recorded in the memory 53) in the later mentioned step S36. As another example, a function to perform thumbnail display may be added. Or both of these functions may be added, then the zoom magnification can be increased as ×2, ×4, ... every time the portion where the character "T" is printed on the zoom switch 51 is pressed, and a number of displayed thumbnails can be changed as 12, 30, ... every time the portion where the character "W" is printed on the zoom switch 51 is pressed, for example.

In the same manner, the dimming switch 52 can also be switched to another function, and can function as, for example, a display switch which displays or does not display such image capturing conditions as zoom magnification and brightness of illumination used during image capturing, or as a "trash" switch for trashing an image currently being displayed on the monitor 12.

In step S36, the control board 56 displays the image data, recorded in the memory 53, on the monitor 12. For example, the control board 56 thumbnail-displays the images recorded thus far on the monitor 12, or display the last image that was recorded, on the monitor 12.

In step S37, the control board 56 executes the desired image processing on the image data according to the operation which the user performed on such an operation unit as the touch panel of the monitor 12, or the mouse. For example, while watching images displayed on the monitor 12, the user can confirm these images, delete an image, change a file name and execute such image processing as adjustment of hue and contrast. These operations are performed via the touch panel integrated with the monitor 12, or via a mouse which is USB-connected to the stand 22.

The user can also display a selected image on the monitor 12, and perform various measurements in the image, such as length, area and angle. These operations, which are executed by the control board 56 disposed on the stand 22, can be performed even if the main body 21 is not connected to the stand 22. If a PC (not illustrated) is connected to the stand 22 in advance, the images can be transferred to the PC.

This configuration allows using the equipment effectively even if the user is operating in a distant location using the main body 21 separated from the stand 22, another user can perform operation using the recorded images. After the processing in step S37, processing advances to step S38.

If control processing is executed in the state of the main body 21 being installed in the stand 22 in step S33, or if image processing is performed in step S37, the control board 56 determines whether the power of the stand 22 is turned OFF or not in step S38. If it is determined that the power is not turned OFF in step S38, processing returns to step S30, and the above mentioned processing is repeated until the power switch (not illustrated) of the stand 22 is turned OFF.

If it is determined that the power is turned OFF in step S38, on the other hand, the control board 56 turns the power of the stand 22 OFF, and the processing of the stand side control unit ends.

Another embodiment of the microscope observation system will now be described with reference to FIG. 7, FIG. 8 and FIG. 9.

Figure 7:
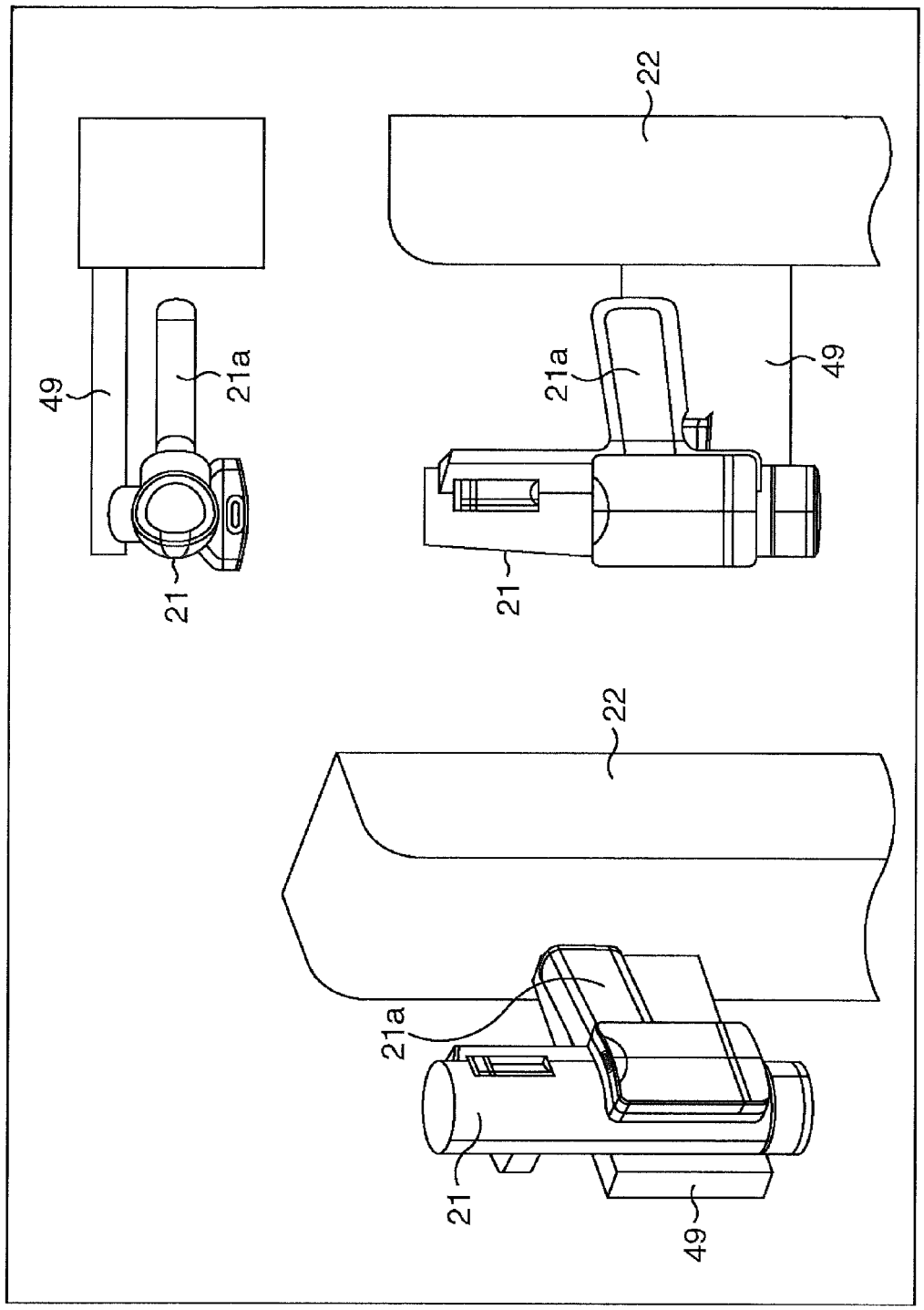
FIG. 7 is a diagram depicting an external configuration example according to another embodiment of the microscope observation system.

FIG. 7 is a diagram depicting the relationship of the main body 21 and the stand 22 according to another embodiment, and includes a front view, a top view and a perspective view. For the stand 22, only the portion where the main body 21 is installed is illustrated for purpose of description.

The gripping section 21a of the main body 21 is disposed approximately at the center of the main body 21, that is, an area around the center of gravity position of the main body 21. The installation portion with the stand 22 is the side face of the main body 21, and is attached to the side face of the arm 49 extended from the stand 22.

Figure 8:
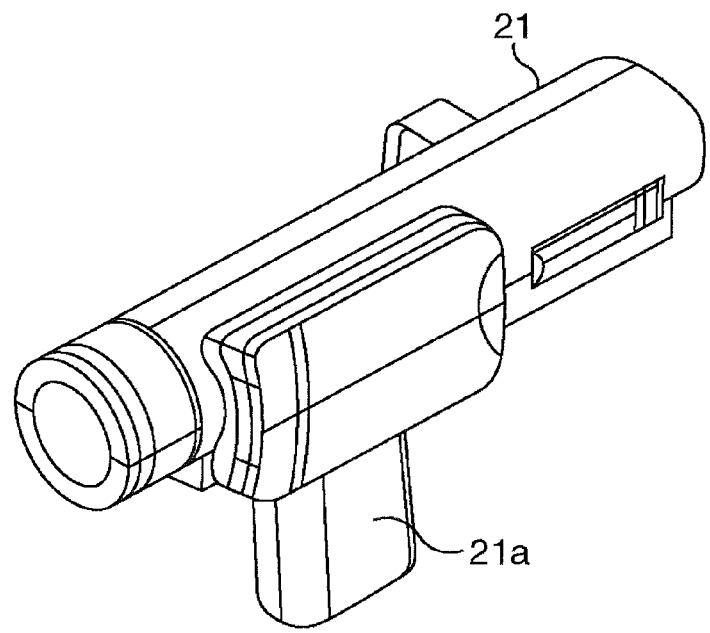
FIG. 8 is a diagram depicting an external configuration example according to another embodiment of the microscope observation system.
Figure 9:
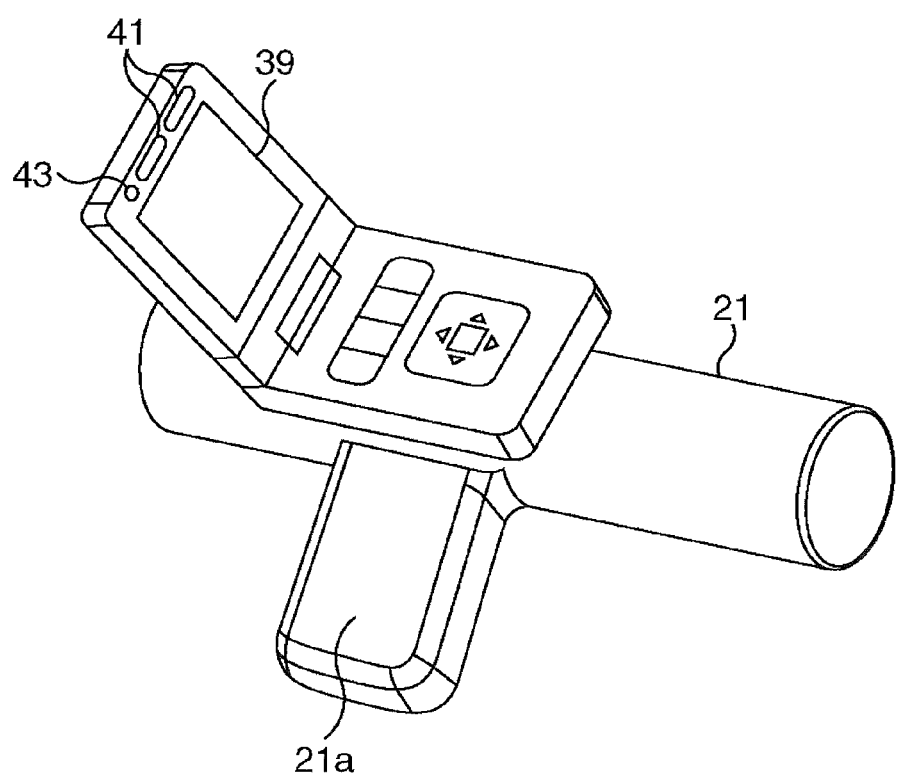
FIG. 9 is a diagram depicting an external configuration example according to another embodiment of the microscope observation system.

As FIG. 8 illustrates, in the state where the main body 21 is removed from the stand 22, the user can stably hold the main body 21 by gripping the gripping section 21a. As FIG. 9 illustrates, the compact monitor 39, the zoom switch 41 and the capture button 43 are disposed so as to be foldable. By this configuration, the user can capture a desired image of the sample in a relaxed posture.

In the state where the main body 21 is installed in the stand 22, the zoom switch 41, the capture button 43 and the compact monitor 39 of the main body 21, which are not actually necessary to be used, are stored (folded up) in the holding unit, hence the configuration becomes compact, and the design becomes aesthetically pleasing.

Embodiments of the present invention are not limited to the above mentioned embodiments, but numerous modifications can be made without departing from the true spirit and scope of the invention.

DESCRIPTION OF THE REFERENCE NUMERALS 11 microscope
12 monitor
13 sample
21 main body
22 stand
32 LED
33 objective lens
34 zoom optical system
35 image optical system
36 CCD
39 compact monitor
40 memory
41 zoom switch
42 capture button
43 dimming switch
44 control board
45 battery
46-1, 46-2, 46 connector
49 arm
51 zoom switch
52 dimming switch
53 memory
55 charge unit
56 control board
81 female dovetail
82 male dovetail

The invention claimed is:

1. A microscope system comprising:
a portable microscope which has an observation optical system to observe a sample, an image capturing unit to capture an observation image, and a microscope control unit, the portable microscope allowing microscopic observation;
a stand which has an installation unit to install the portable microscope, a stand side operation unit to operate the portable microscope, and a stand side control unit to display image data captured by the portable microscope on a monitor apparatus;
a communication unit disposed on the stand side and in the portable microscope so as to allow communication between the stand and the portable microscope; and
a detection unit disposed on the installation unit of the stand so as to detect whether the portable microscope is installed, wherein
when the detection unit detects that the portable microscope is installed in the installation unit of the stand, operation of the portable microscope is controllable by an operation signal of the stand side operation unit, and
when the portable microscope is not installed in the installation unit of the stand, the microscope control unit of the portable microscope and the stand side control unit can function independently.

2. The microscope system according to claim 1, wherein the portable microscope further comprises a microscope side recording unit to record image data of the observation image captured by the capturing unit, and
the stand side control unit can read the image data recorded in the microscope side recording unit when the portable microscope is installed in the installation unit of the stand.

3. The microscope system according to claim 2, wherein the portable microscope has a microscope side display unit which displays image data captured by the portable microscope, when the portable microscope is not installed in the installation unit of the stand.

4. The microscope system according to claim 1, wherein the stand side control unit has a function of executing the image processing for the image data.

5. The microscope system according to claim 4, wherein the portable microscope has a microscope side display unit which displays image data captured by the portable microscope, when the portable microscope is not installed in the installation unit of the stand.

6. The microscope system according to claim 1, wherein the microscope system is connectable to a monitor apparatus, which displays an image based on the image data obtained by the portable microscope, and displays the image data on the monitor apparatus, based on the control of the stand side control unit, when the portable microscope is not installed in the installation unit of the stand.

7. The microscope system according to claim 1, wherein the portable microscope has a microscope side display unit which displays image data captured by the portable microscope, when the portable microscope is not installed in the installation unit of the stand.

8. The microscope system according to claim 1, wherein the stand has a zoom operation unit which changes a zoom magnification of a zoom optical system of the portable microscope, in a state when the portable microscope is installed in the installation unit of the stand.

9. The microscope system according to claim 1, wherein the stand has a light quantity adjustment unit which adjusts a light quantity of a light source of the portable microscope, in a state where the portable microscope is installed in the installation unit of the stand.

10. The microscope system according to claim 1, wherein the portable microscope has a microscope side battery,
the stand has a stand side battery,
power is supplied to the portable microscope by the stand side battery when the portable microscope is installed in the installation unit of the stand, and
when the portable microscope is not installed in the installation unit of the stand, the microscope control unit switches the supply battery so that power is supplied to the portable microscope by the microscope side battery.

11. The microscope system according to claim 1, wherein the stand has a stand side recording unit, and
when image data recorded in the microscope side recording unit is read, the image data is recorded in the stand side recording unit.

12. The microscope system according to claim 1, wherein the stand has a stand side display unit, and
when selection is made to record the image data in the stand side recording unit, the image data is displayed on the stand side display unit, and the microscope side display unit of the portable microscope installed in the stand displays observation conditions.

* * * * *